UNITED STATES PATENT OFFICE.

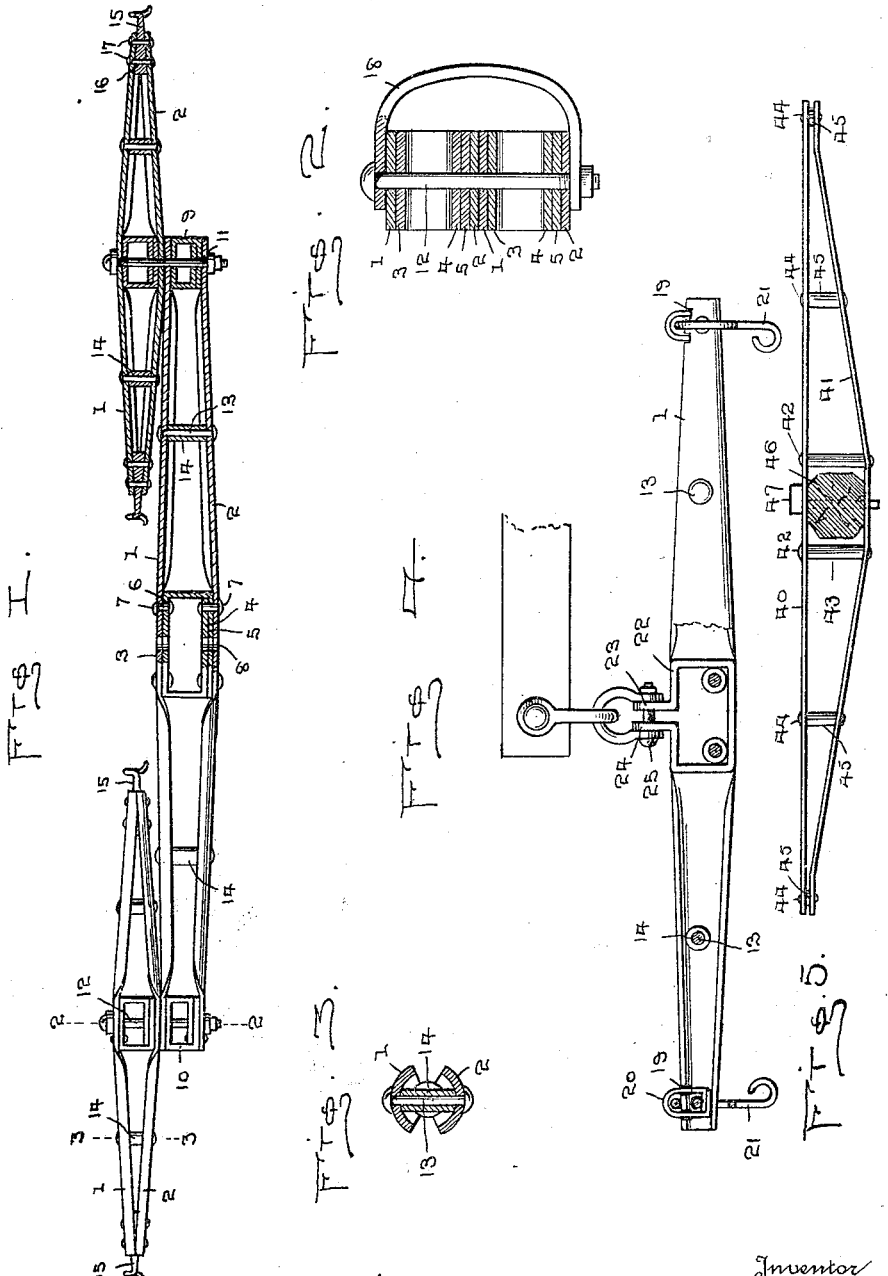

BENNIE P. HANSON, OF MONTICELLO, IOWA, ASSIGNOR OF ONE-HALF TO LONE GRENARD, OF BANCROFT, IOWA.

WHIFFLETREE.

1,137,712. Specification of Letters Patent. Patented Apr. 27, 1915.

Application filed February 21, 1914. Serial No. 820,201.

*To all whom it may concern:*

Be it known that I, BENNIE P. HANSON, citizen of the United States, residing at Monticello, in the county of Jones and State of Iowa, have invented certain new and useful Improvements in Whiffletrees; and I do hereby declare the following to be a full, clear, and exact description of the invention, such as will enable others skilled in the art to which it appertains to make and use the same.

My invention relates to metallic whiffle trees and the objects of my invention are to have a whiffle tree that is exceedingly strong, durable, light and compact.

I obtain these objects by means of the device shown and illustrated in which,

Figure 1 is an elevation with one portion shown in section. Fig. 2 is a sectional view on the line 2—2 of Fig. 1. Fig. 3 is a sectional view on the line 3—3 of Fig. 1. Fig. 4 is a modification adapted to the clevis structure. Fig. 5 is a side elevation of a slightly modified form of the double tree.

For my device I take two flat metallic bars 1 and 2 respectively, swage their edges intermediate of their center and end as shown in Fig. 1. Between said bars I place a metallic box-like structure 3 formed of a flat piece of metal bent to box formation, one end 4 of which overlapping the other end 5. At suitable points are apertures 6 for the purpose of attaching the box between said bars 1 and 2 by means of bolts or rivets 7 as shown in Fig. 1 of the drawings. Registering apertures 8 through said bars 1 and 2 and box 3 are placed in the center thereof for the insertion of a clevis or king bolt. Like boxes 9 and 10 are inserted between the ends of said bars 1 and 2. Said boxes 9 and 10 are of smaller dimensions than the center box 3 which allows of a bridge formation in the assembling of said members 1 and 2 adding to the strength of my structure. In like manner are registering orifices 11 therethrough for the insertion of a clevis bolt 12 as fully shown in Fig. 2. Midway between the center and ends of my whiffle tree I reinforce my device by means of bolts 13 run through sleeves 14.

My swingletree is of like construction with the exception that I have hooks 15 placed between the bars at the end thereof, said hooks being curved to suitable formation on their portions extended beyond the swingletree. These hooks perform the same function as the boxes 9 and 10 on my double tree and are attached thereto by means of registering orifices 16 through which are run bolts 17, said swingletree I attach, in one form, to the double tree by means of the clevis 18 and clevis bolt 12 as heretofore noted.

A modified structure of swingletree is had as illustrated in Fig. 4 wherein slots 19 are cut into the bars 1 and 2 previous to swaging and assembling so that when assembled the slots which register become apertures for the insertion of retaining eyes 20 which hold the trace hooks 21. In the center of my modified structure, I bend into approximately rectangular form my box like structure 22 of any suitable metallic structure, as shown, having extensions or lugs 23 and 24 with apertures therein for the insertion of a clevis bolt 25.

Referring to the modified construction of the doubletree shown in Fig. 5, the numeral 40 indicates the tree bar and is formed straight or plane and with or without swaged edges, as the bars 1 and 2. The bottom bar 41 is secured in spaced relation at its medial portion to the corresponding portion of the top bar 40 by suitable bolts or rivets 42 extending through spacing sleeves 43. The portions of the bars 40 and 41 at and adjacent the ends are secured together by bolts or rivets 44 positioned through sleeves 45, and as clearly shown the extreme ends are drawn close together. The central rivets 42 are spaced a proper distance apart to accommodate the wagon tongue 46 to which the doubletree is secured by a king bolt or the like 47 extending through apertures in said tree and in said tongue.

Of course I do not limit my structure to the exact form and shape of which I have herein shown, but wish to have it understood that I may make such minor differences in the following embodiments of my invention as shall lie within the scope of the appended claim. For instance I can have a greater number of reinforcing bolts 13 and sleeves 14 or I can have a greater multiplicity of boxes such as 3, 9, 10 and 22 respectively than what I have shown. This device allows of easy operation and will stand great strain.

What I claim is:

A whiffle tree composed of a double tree having swaged top and bottom members reinforced by metallic devices bent into approximately rectangular formation, one end of which overlaps and reinforces the other end, registering orifices through said whiffle tree and said reinforcing devices for the insertion of a clevis, a swingletree of like structure superposed above said double tree having registering apertures therethrough, a clevis coupling said double tree and said swingletree together.

In testimony whereof I have signed my name to this specification in the presence of two subscribing witnesses.

BENNIE P. HANSON.

Witnesses:
L. W. LOVELL,
F. R. THOMPSON.

Copies of this patent may be obtained for five cents each, by addressing the "Commissioner of Patents, Washington, D. C."